United States Patent [19]
Reitmeier

[11] Patent Number: 5,987,180
[45] Date of Patent: Nov. 16, 1999

[54] MULTIPLE COMPONENT COMPRESSION ENCODER MOTION SEARCH METHOD AND APPARATUS

[75] Inventor: Glenn Arthur Reitmeier, Yardley, Pa.

[73] Assignee: Sarnoff Corporation, Princeton, N.J.

[21] Appl. No.: 09/002,295

[22] Filed: Dec. 31, 1997

Related U.S. Application Data

[60] Provisional application No. 60/060,112, Sep. 26, 1997.

[51] Int. Cl.[6] ........................................ G06K 9/36
[52] U.S. Cl. ............................................... 382/236
[58] Field of Search ..................... 382/232, 234, 382/235, 236, 238, 239, 240, 250, 251, 252, 253, 241, 242, 243, 244, 246, 248; 348/390, 407, 400, 408, 401, 415, 402, 416, 409, 699; 358/261.2

[56] References Cited

U.S. PATENT DOCUMENTS

| | | | |
|---|---|---|---|
| 5,146,325 | 9/1992 | Ng | 382/236 |
| 5,703,966 | 12/1997 | Astle | 382/236 |
| 5,812,787 | 9/1998 | Astle | 382/236 |

*Primary Examiner*—Jose L. Couso
*Attorney, Agent, or Firm*—William J. Burke

[57] ABSTRACT

A method and concomitant apparatus that adaptively utilizes luminance and chrominance information to optimize motion estimation in an MPEG-like compression encoder.

10 Claims, 3 Drawing Sheets

MULTIPLE COMPONENT COMPRESSION ENCODER MOTION SEARCH METHOD AND APPARATUS

The invention claims benefit of U.S. Provisional Application Ser. No. 60/060,112, filed Sep. 26, 1997 and incorporated herein by reference in its entirety.

The present invention relates to an apparatus and concomitant method for optimizing the coding of motion video. More particularly, this invention relates to a method and apparatus that adaptively utilizes luminance and chrominance information to estimate motion in an MPEG-like encoder.

BACKGROUND OF THE INVENTION

The Moving Picture Experts Group (MPEG) created the ISO/IEC international Standards 11172 and 13818 (generally referred to as MPEG-1 and MPEG-2 format respectively) to establish a standard for coding/decoding strategies. Although these MPEG standards specify a general coding methodology and syntax for generating an MPEG compliant bitstream, many variations are permitted to accommodate a plurality of different applications and services such as desktop video publishing, video conferencing, digital storage media and television broadcast. A related video encoding standard is the "Draft ITU-T Recommendation H.263: Video Coding for Low Bitrate Communication" (December 1995), which has been promulgated by the International Telecommunications Union. The above standards are herein incorporated by reference in their respective entireties.

MPEG-like encoder algorithms depend upon on creating an estimate of an image to be compressed, and subtracting from the image to be compressed the pixel values of the estimate or prediction. If the estimate is good, the subtraction will leave a very small residue to be transmitted. If the estimate is not close to zero for some pixels or many pixels, those differences represent information that needs to be transmitted so a decoder can reconstruct the image correctly. The kinds of image sequences that cause large prediction differences include severe motion and/or sharp details.

MPEG-like video coding systems use motion compensated prediction as part of the data compression process. Thus macroblocks in the current frame of interest are predicted by macroblock-sized regions in previously transmitted frames. Motion compensation refers to the fact that the locations of the macroblock-sized regions in the reference frame can be offset to account for local motions. The macroblock offsets are known as motion vectors.

The various standards do not specify how encoders should determine motion vectors. It is, therefore, the task of the encoder designer to implement a motion estimation and motion compensation process. Currently, motion estimation and motion compensation implementations utilize luminance information from an input video signal. This is largely a matter of convenience and practicality, since the luminance (Y) signal is higher in bandwidth than color difference signals (U and V), thereby containing more accurate edge information and allowing good motion estimation to be made. Since motion estimation is the most computation intensive (and thus costly) part of a video compression encoder, the use of the luminance signal alone is the traditional motion estimation approach in such encoders.

Unfortunately, compression encoders implementing luminance signal motion estimation and compensation typically exhibit artifacts in areas of low luminance energy, such as deep blacks, or highly saturated reds and blues. In these instances of low luminance signal energy, motion vector information computed using the luminance signal tends to be inaccurate. The effect of this inaccuracy propagates to an end user's decoder and display device, producing visual artifacts such as a "wormy" image, which can be very annoying.

Therefore, a need exists in the art for a high quality encoding apparatus and method that eliminates the above-described artifacts by performing a more thorough motion estimation computation.

SUMMARY OF THE INVENTION

The invention is a method and concomitant apparatus that adaptively utilizes luminance and chrominance information to optimize motion estimation in an MPEG-like compression encoder. The invention optimizes motion-related compression coding of a video signal by examining luminance (Y) and color difference (U, V) components within the video signal, identifying a preferred component to represent motion within the video signal, and providing the preferred component to motion encoding circuitry within a decoder.

Specifically, one embodiment of the invention is a method for optimizing motion estimation within a block-based coding system, comprising the steps of: estimating, using a luminance component, the motion of a macroblock to be coded with respect to an anchor frame, to produce a first motion vector and first residual; estimating, using a first chrominance component, the motion of the macroblock to be coded with respect to the anchor frame, to produce a second motion vector and second residual; and selecting a preferred motion vector to use in a subsequent motion estimation or motion encoding process.

Another embodiment of the invention is an apparatus for estimating motion in a block-based coding system, comprising: a first component weighter, coupled to receive luminance and chrominance information associated with a macroblock to be coded, for generating a weighted macroblock component signal; a second component weighter, coupled to receive luminance and chrominance information associated with an anchor frame, for generating a weighted anchor frame component signal; and a motion estimator, coupled to the first and second component weighters, for generating a motion vector and an associated residual.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Although the present invention is described within the context of an MPEG compliant encoder, those skilled in the art will realize that the present invention can be adapted to other encoders that are compliant with other coding/decoding standards.

Figure 1:
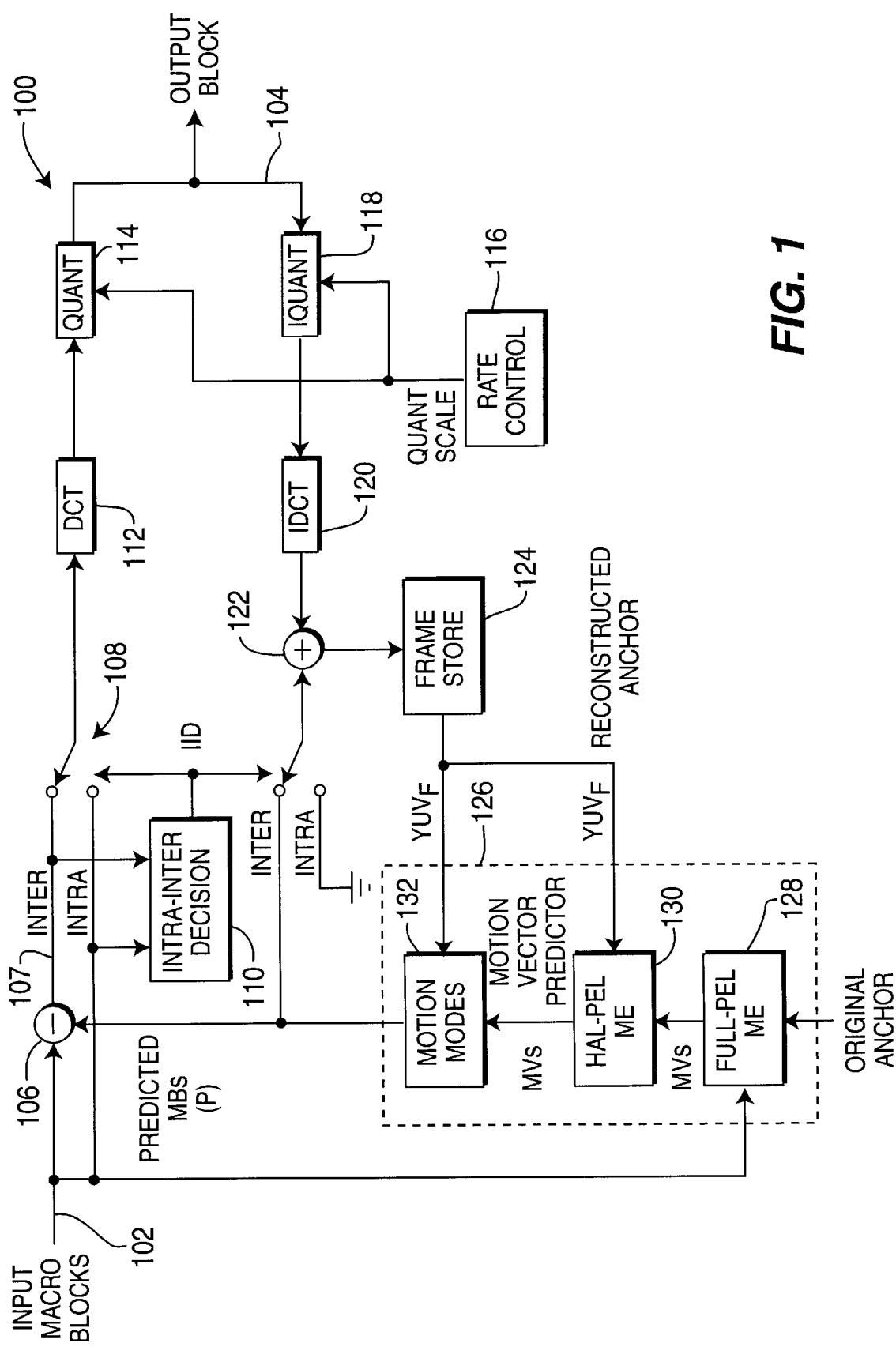
FIG. 1 depicts a high level block diagram of a block-based coding system (specifically, an MPEG encoder) incorporating the present invention.

FIG. 1 depicts a high level block diagram of a block-based coding system 100 (specifically, an MPEG encoder) incorporating the present invention. The input signal, at port 102, to the system is assumed to be a preprocessed image that has been partitioned into a plurality of blocks, where the blocks are sequentially provided as an input to the system. Under the MPEG standard, these blocks of pixels are commonly known as macroblocks, e.g., a 16×16 pixel block comprised of a collection of four 8×8 luminance blocks and two co-located 8×8 chrominance blocks. The following disclosure uses the MPEG standard terminology; however, it should be understood that the term macroblock is intended to describe a block of pixels of any size that is used for the basis of motion compensation.

The system 100 computes, from the input signal motion vectors and the stored reconstructed anchor frame, a series of predicted macroblocks (P). Each predicted macroblock is illustratively produced by decoding the output signal, at port 104, just as the receiver of the transmitted output signal would decode the received signal. Subtractor 106 generates, on path 107, a residual signal (also referred to in the art as simply the residual or the residual macroblock) by subtracting the predicted macroblock from the input macroblock.

If the predicted macroblock is substantially similar to the input macroblock, the residuals are relatively small and are easily coded using very few bits. In such a scenario, the macroblock will be encoded as a motion compensated macroblock, i.e., motion vector(s) and associated residual(s). However, if the difference between the predicted macroblock and the input macroblock is substantial, the residuals are difficult to code. Consequently, the system operates more efficiently by directly coding the input macroblock rather than coding the motion compensated residual macroblock. This selection is known as a selection of the coding mode. Coding the input macroblock (I) is referred to as intra-coding, while coding the residuals is referred to as inter-coding. The selection between these two modes is known as the Intra-Inter-Decision (IID).

The IID is made by the IID circuit 110, which sets the coding mode switch 108. The IID is typically computed by first computing the variance of the residual macroblock (Var R) and the variance of the input macroblock (Var I). The coding decision is based on these values. There are several functions that can be used to make this decision. For example, using the simplest function, if Var R is less than Var I, the IID selects the Inter-mode. Conversely, if Var I is less than Var R, the IID selects the Intra-mode.

The selected block is processed in a discrete cosine transform (DCT) block 112. The DCT produces coefficients representing the input signal to the DCT. A quantizer 114 quantizes the coefficients to produce the output block at port 104. A dynamic rate controller 116 controls the quantization scale (step size) used to quantize the coefficients. Optionally, the rate controller 116 also controls the number of DCT coefficients that are coded by the system.

The primary task of the dynamic rate controller 116 is to manage the fullness of a rate buffer from which a constant output bit rate is provided to a transmission channel. The constant bit rate must be maintained even though the encoding rate may vary significantly, depending on the content of each image and the sequence of images. Another important task of the dynamic rate controller 116 is to insure that the bit stream produced by the encoder does not overflow or underflow a decoder's input buffer. Overflow and underflow control is accomplished by maintaining and monitoring a virtual buffer within the encoder. This virtual buffer is known as the video buffering verifier (VBV). To ensure proper decoder input buffer bit control, the encoder's rate control process establishes for each picture, and also for each macroblock of pixels comprising each picture, a bit quota (also referred to herein as a bit budget). By coding the blocks and the overall picture using respective numbers of bits that are within the respective bit budgets, the VBV does not overflow or underflow. Since the VBV mirrors the operation of the decoder's input buffer, if the VBV does not underflow or overflow, then the decoder's input buffer will not underflow or overflow.

To accomplish such buffer control, the rate controller makes the standard assumption in video coding that the current picture looks somewhat similar to the previous picture. If this assumption is true, the blocks of pixels in the picture are motion compensated by the coding technique and, once compensated, require very few bits to encode. This method works very well, as long as the actual number of bits needed to code the picture is near the target number of bits assigned to the picture, i.e., that the number of bits actually used is within the bit quota for that picture.

A dynamic rate controller method and apparatus is disclosed in U.S. patent application Ser. No. 08/606,622, filed Feb. 26, 1996 for DYNAMIC CODING RATE CONTROL IN A BLOCK-BASED VIDEO CODING SYSTEM, and incorporated herein by reference in its entirety. A feature of the rate control method and apparatus disclosed in the above-incorporated application is the ability to detect "scene-cuts" and responsively adapt the rate control process to intra-code the macroblocks associated with the new scene.

To most accurately compute the residual, the encoder needs access to the decoded images. To accomplish such access, the quantizer 114 output is passed through both an inverse quantizer 118 and an inverse DCT 120. The output of the inverse DCT is ideally identical to the input to the DCT 112. In the inter-mode, the decoded macroblock is produced by summing the output of the inverse DCT and the predicted macroblock. During the intra-mode, the decoded macroblock is simply the output of the inverse DCT. The decoded macroblocks are then stored in a frame store 124. The frame store accumulates a plurality of these "reconstructed" macroblocks that constitute an entire reconstructed frame of image information. The motion vector predictor 126 uses the reconstructed frame as data for motion vectors that are used in generating predicted macroblocks for forthcoming input images.

To generate motion vectors, the motion vector predictor 126 comprises three components: a full-pel motion estimator 128, a half-pel motion estimator 130, and a motion mode block 132. The full-pel motion estimator 128 is a "coarse" motion vector generator that searches for a coarse match between a macroblock in a previous image and the present input macroblock. This course match is typically determined with respect to the luminance information components of the previous image and the present input macroblock. The previous image is referred to as an anchor image. Under the MPEG standards, the anchor image is what is known as an I or P frame within an image sequence known as a Group Of Pictures (GOP). The motion vector is a vector representing the relative position where a coarse match was found between the two macroblocks. The coarse motion vector generator 128 produces a motion vector that is accurate to one picture element (pel).

The accuracy of the full-pel motion estimator 128 is improved in the half-pel motion estimator 130. The half-pel estimator 130 uses the full-pel motion vectors and the reconstructed macroblocks from the frame store 124 to compute motion vectors to half-pel accuracy. The half-pel motion vectors are then sent to the motion modes block 132. Depending on the frame type (i.e., I, P or B), there may be multiple motion vectors related to each macroblock. I-frame or intra-coded macroblocks do not utilize any prediction, P-frame or forward predicted macroblocks are associated with respective forward predicted motion vectors and residuals, while B-frame or backward predicted macroblocks are associated with both forward and backward predicted motion vectors and residuals. The modes block 132 selects the best motion vector for representing motion for each input macroblock.

Full-pel motion estimation is a more computationally intensive task than half-pel motion estimation. Moreover, full-pel motion estimation is typically computed using only one component of the respective macroblocks, namely the luminance component. Typically, the full pel estimator 128 utilizes a single component, namely the luminance component within a macroblock being encoded. Similarly, the half-pel motion estimator 130 typically utilizes the same component, namely the luminance component, to perform the half-pel motion estimation of the macroblock being encoded.

The concepts of Motion Estimation and Motion Compensation are based on an underlying assumption that the current picture is not very different from a previously occurring picture (the anchor image). However, when, e.g., a substantial scene change occurs, the anchor pictures are substantially different from the current picture. Hence, the predicted macroblocks are very inaccurate and the residuals are large. As such, for most input macroblocks of a picture, the IID selects the input macroblock (intra-mode) for coding in lieu of coding the residuals (inter-mode).

Since the intra-mode of coding a macroblock typically requires a larger portion of the bit budget than the inter-coding of the macroblock, it is desirable that the motion estimation circuitry or software provides accurately predicted macroblocks having relatively small residuals. In high quality encoders it is crucial to optimally utilize the bit budget to provide, e.g., selective enhancement of portions of a picture. For example, a method for preferentially increasing an encoding bit allocation to macroblocks including preferred chrominance information, e.g., flesh-tone chrominance information, is described in U.S. patent application Ser. No. 09/001,619, filed simultaneously herewith (Attorney Docket 12661), and incorporated herein by reference in its entirety.

The present inventor recognized that certain types of macroblocks are not accurately predicted from an anchor picture due to the type of prediction employed. That is, predictive methodologies utilizing only the luminance "space" of the anchor picture and macroblock to be coded may be thwarted by content-related features of the macroblock, the anchor picture or both. Specifically, luminance prediction has been found to be less reliable in the case of macroblock or anchor picture content having low luminance energy, such as deep blacks, or highly saturated reds and blues. Thus, in the case of low luminance energy, motion vector information computed using the luminance signal alone tends to be inaccurate. This inaccuracy propagates to an end user's decoder and display device, producing visual artifacts, such as a "wormy" image, which can be very annoying. Also, such inaccurate luminance predictions may cause the IID to produce an erroneous intra-mode decision, wherein the macroblock will be encoded in a less than efficient manner by utilizing more bits than necessary.

Figure 2:
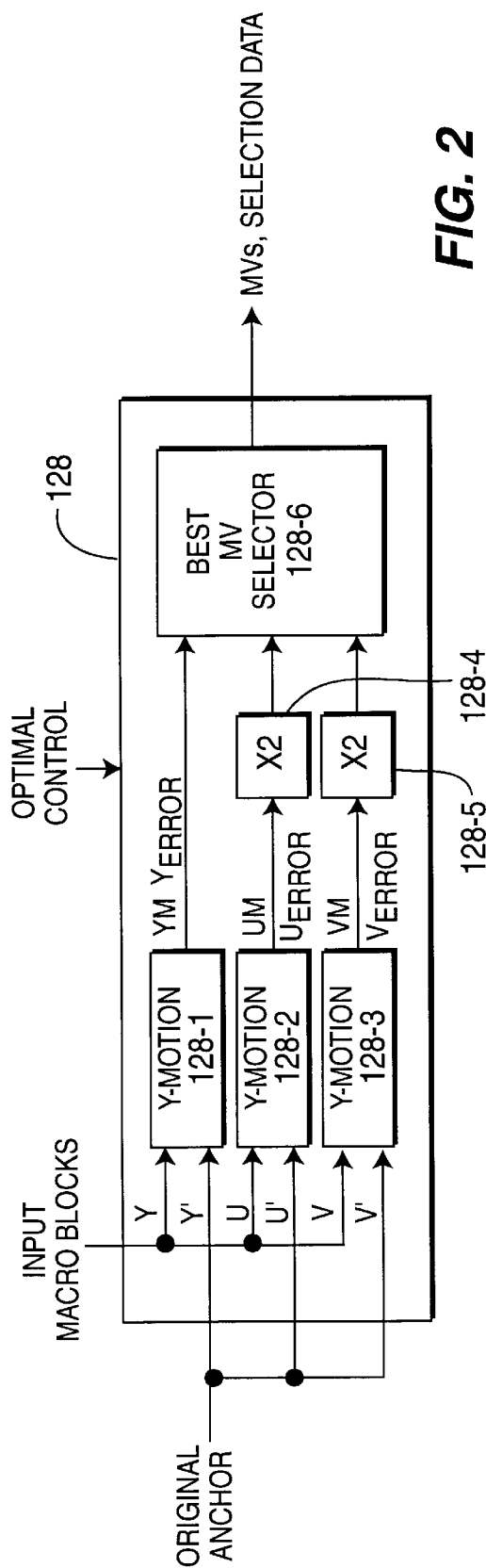
FIG. 2 depicts a full-pel motion estimator according to an embodiment of the invention and suitable for use in the block-based coding system of FIG. 1.

FIG. 2 depicts a full-pel motion estimator 128 according to an embodiment of the invention and suitable for use in the block-based coding system of FIG. 1. Specifically, motion estimator 128 of FIG. 2 comprises a full-pel luminance motion estimator 128-1, a full-pel first color difference motion estimator 128-2, a full-pel second color difference motion estimator 128-3, a first multiplier 128-4, a second multiplier 128-5, and a best motion vector selector 128-6.

The luminance motion estimator 128-1 is responsive to a luminance component Y of a macroblock within the input macroblock stream 102, and a luminance component Y of the original anchor frame, to produce an output signal YM. The output signal YM comprises a luminance component Y motion estimation signal indicative of luminance "space" motion of the input macroblock with respect to the anchor frame. The output signal YM also comprises an error measurement Yerror indicative of the accuracy of the luminance component Y motion estimation. The luminance component motion estimation signal YM and error measurement Yerror are coupled to a first input of the best motion vector selector 128-6.

The first color difference motion estimator 128-2 is responsive to a first color difference component U (or $C_R$) of a macroblock within the input macroblock stream 102, and a first color difference component U' of the original anchor frame, to produce an output signal UM. The output signal UM comprises a first color difference component U motion estimation signal indicative of first color difference "space" motion of the input macroblock with respect to the anchor frame. The output signal UM also comprises an error measurement Uerror indicative of the accuracy of the first color difference component U motion estimation. The first color difference motion estimation signal UM and error measurement Uerror are coupled to the first multiplier 128-4, where they are multiplied by a factor of two. That is, the vertical displacement component and the horizontal displacement component of the motion vector is multiplied by two. It is important to note that the circuitry for implementing the multiply by two function may comprise a simple shift register, since shifting a binary number left one bit is multiplying that number by two. The output of the first multiplier is coupled to a second input of the best motion vector selector 128-6.

The second color difference motion estimator 128-3 is responsive to a second color difference component V (or $C_B$) of a macroblock within the input macroblock stream 102, and a second color difference component V' of the original anchor frame, to produce an output signal VM. The output signal VM comprises a second color difference component V motion estimation signal indicative of second color difference "space" motion of the input macroblock with respect to the anchor frame. The output signal VM also comprises an error measurement V error indicative of the accuracy of the second color difference component V motion estimation. The second color difference motion estimation signal VM and error measurement V error is coupled to the second multiplier 128-5, where they are multiplied by a factor of two. The output of the second multiplier is coupled to a third input of the best motion vector selector 128-6.

It is important to note that the full-pel luminance motion estimator 128-1 is likely to be more complex than either of the full-pel first color difference motion estimator 128-2 and the full-pel second color difference motion estimator 128-3. This is because typical MPEG video formats utilize more luminance information than chrominance information. For example, the well known 4:2:0 video format utilizes four luminance (Y) samples and two chrominance samples (one each of U and V). Thus, the amount of 4:2:0 video data to be processed by the full-pel luminance motion estimator 128-1 is four times greater than the amount of data to be processed by either of the first and second color difference motion estimators 128-2, 128-3. In applications where higher vertical chrominance resolution is desired, a 4:2:2 video format is typically used. The 4:2:2 format utilizes four luminance (Y) samples and four chrominance samples (two each of U and V). Thus, the amount of 4:2:2 formatted video data to be processed by the full-pel luminance motion estimator 128-1 is two times greater than the amount of data to be processed by either of the first and second color difference motion estimators 128-2, 128-3. In the case of using the 4:2:2 video format, there is no need to multiply the vertical displacement component of the motion vector by two and, therefore, the first and second multipliers are only operative upon the horizontal displacement component of the motion vector.

The first color difference motion estimator 128-2 and second color difference motion estimator 128-3 work in substantially the same manner. Moreover, the factor of two multiplication utilized by first multiplier 128-4 and second multiplier 128-5 assumes that the 4:2:0 video format data is being used. Other multiplication factors may be used, depending upon the video format of the macroblocks being processed.

The best motion vector selector 128-6 utilizes, e.g., the error measurement associated with each of the luminance YM, first color difference UM and second color difference VM motion estimation signals to determine which motion estimation signal most accurately represents the relative motion between the input macroblock and the anchor frame (i.e., the "best" motion estimate). The best motion estimation signal is coupled to an output of full-pel motion estimator 128 as motion vectors (MVs) for use by, e.g., half-pel motion estimator 127. In addition, the output signal of the full-pel motion estimator 128 includes selection indicium (SELECTION DATA) that indicates type of motion estimation selected as the "best" type. The selection indicium is utilized by, e.g., half-pel motion estimator 127 to further refine the motion estimate using the "best" motion estimation component, and by motion mode block 132 to assist in the motion mode decision process.

In one embodiment of the invention, decision logic of a known type within the selector 128-6 is used to compare the error measurement portion Yerror, Uerror and V error of the three motion estimation signals YM, UM and VM. The decision logic couples to an output (i.e., selects as "best") that motion estimation signal (YM, UM or VM) having the lowest error measurement. The decision logic utilizes, illustratively, mean square error metrics or minimum absolute error metrics as part of the selection process. In another embodiment of the invention, the luminance motion estimation signal YM is preferentially coupled to the output. That is, the luminance motion estimation signal YM is coupled to the output as long as the error metric Yerror associated with that signal is below a threshold level. The threshold level may be predetermined, selectable or adaptively controlled in response to, e.g., a user input signal optional control.

Figure 4:
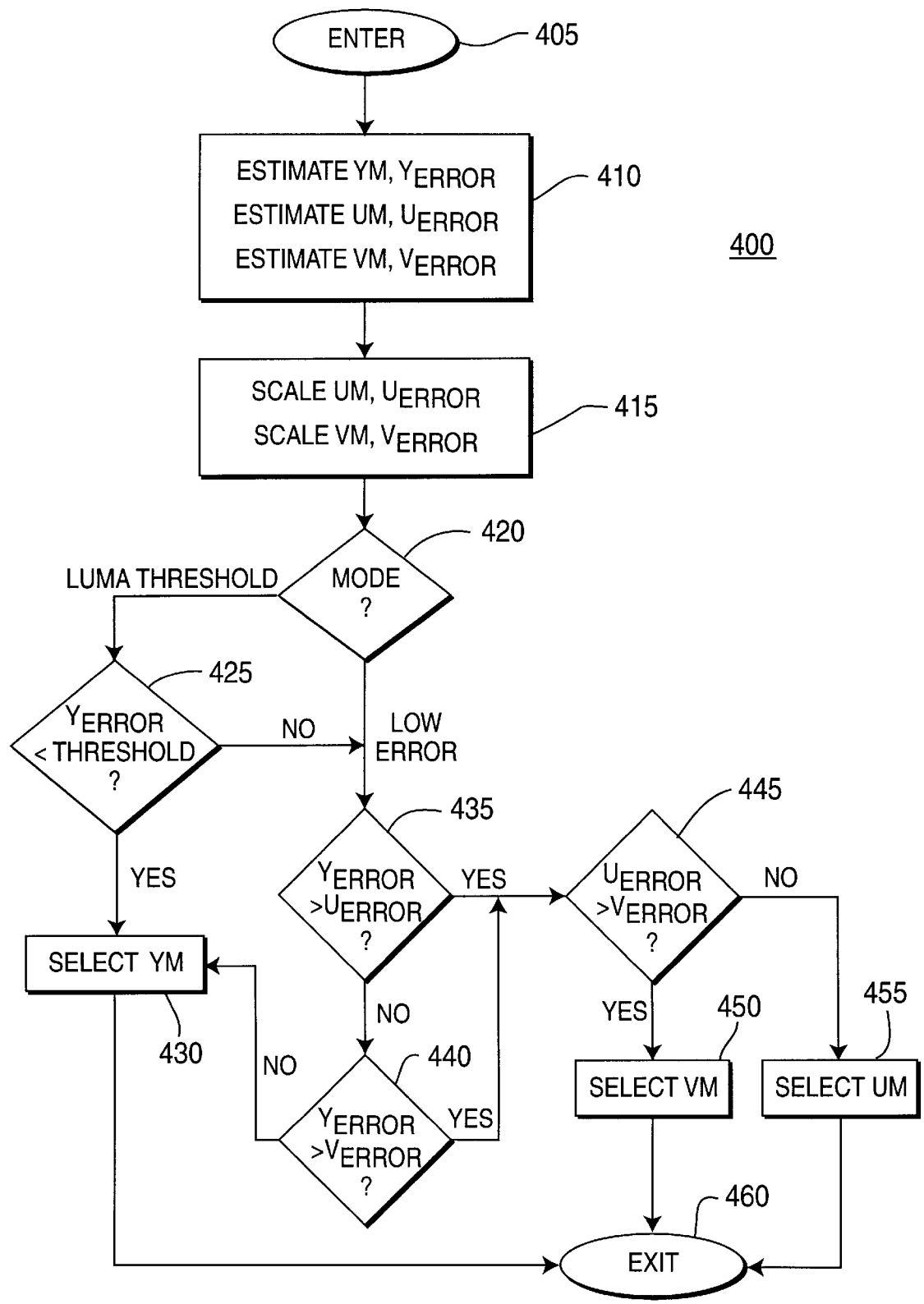
FIG. 4 depicts a flow diagram of a motion vector generation and selection process suitable for use in the motion estimator of FIG. 2.

FIG. 4 depicts a flow diagram of a motion vector generation and selection process suitable for use in the motion estimator 128 of FIG. 2. Specifically, the motion vector generation and selection routine 400 is used to identify which of the luminance (YM), first chrominance (UM), and second chrominance (VM) full pel motion estimation values is the "best" motion estimation value to use in subsequent processing steps or circuitry, such as illustratively represented by half-pel motion vector predictor 130 and motion mode block 132 of FIG. 1. Each of the luminance (YM), first chrominance (UM), and second chrominance (VM) full pel motion estimation values are used to compute an error (i.e., residual) for the entire macroblock. In the following discussion, the term Yerror refers to the error of the entire macroblock when computed using the luminance (YM) motion estimation value as the predictor. Similarly, the terms Uerror and Verror refer to the error of the entire macroblock when computed using, respectively, the first chrominance (UM) and second chrominance (VM) motion estimation values as the predictor.

The routine 400 is entered at step 405, when the luminance and chrominance information Y,U,V of a macroblock is input into the full pel motion estimation unit 128. The routine 400 proceeds to step 410 where full pel motion vectors, and motion vector errors associated with luminance space (Y), first chrominance space (U), and second chrominance space (V) are estimated. The routine 400 then proceeds to step 415, where the first and second chrominance space motion vectors (UM, VM) and motion vector errors (Uerror, V error) are scaled to compensate for luminance and chrominance sampling density differences. In the case of a 4:2:0 video format, the scaling factor is two. The routine then proceeds to step 420, where a query is made as to the operational mode of the best MV selector unit. If the answer to the query at step 420 is a "Luminance Threshold" mode of operation, then the routine 400 proceeds to step 425, where the error associated with the estimated luminance space motion vector error (Yerror) is compared to a threshold level. If the comparison at step 425 indicates that the estimated luminance space motion vector error (Yerror) is less than the threshold level, then the routine proceeds to step 430, where the estimated luminance space motion vectors (YM) are selected as the best motion vectors.

If the query at step 420 indicates that a "Low Error" mode of operation is to be utilized, or the comparison at step 425 indicates that the estimated luminance space motion vector error (Yerror) is equal to or above the threshold level, then the routine 400 proceeds to step 435. At step 435, the estimated luminance space motion vector error (Yerror) is compared to the estimated first chrominance space motion vector error (Uerror). If the Yerror is greater than the Uerror, then the routine 400 proceeds to step 445. If Yerror is less than the Uerror, then the routine 400 proceeds to step 440.

At step 440, the estimated luminance space motion vector error (Yerror) is compared to the estimated second chrominance space motion vector error (Verror). If Yerror is greater than Verror, the routine 400 proceeds to step 445. If the Yerror is less than the Verror, the routine 400 proceeds to step 430, where the estimated luminance space motion vectors (YM) are selected as the best motion vectors. After selecting the best motion vectors, the routine 400 proceeds to step 460, where it is exited.

At step 445, the estimated first chrominance space motion vector error (Uerror) is compared to the estimated second chrominance space motion vector error (Verror). If Uerror is greater than Verror, the routine 400 proceeds to step 450, where the estimated second chrominance space motion vectors (VM) are selected as the best motion vectors. If the Uerror is less than the Verror, the routine 400 proceeds to step 455, where the estimated first space motion vectors (UM) are selected as the best motion vectors. After selecting the best motion vectors, the routine 400 proceeds to step 460, where it is exited.

Figure 3:
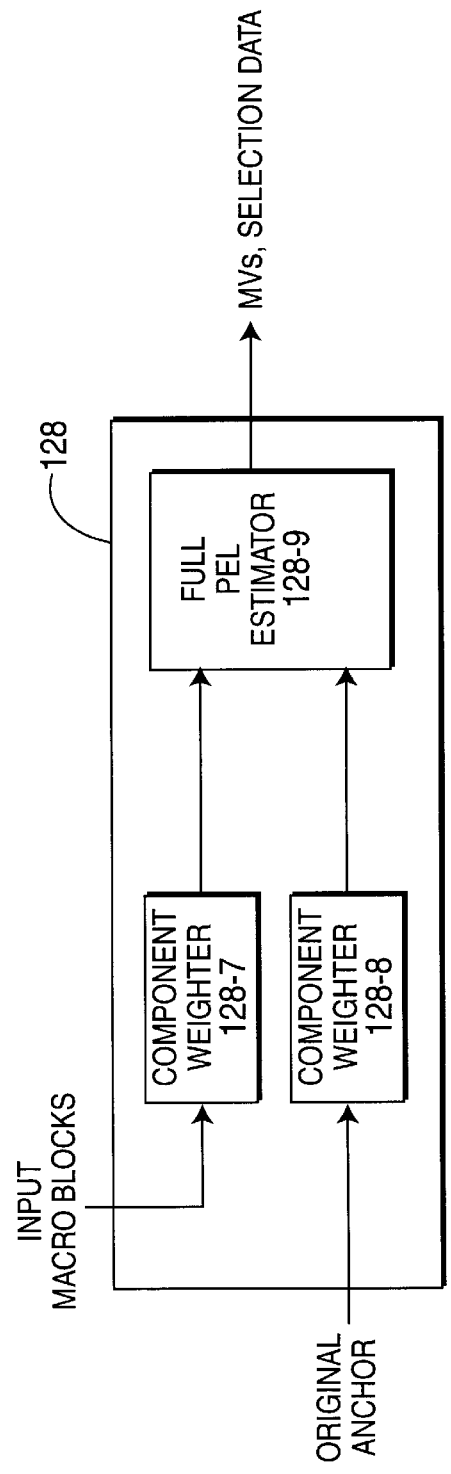
FIG. 3 depicts a full-pel motion estimator according to an embodiment of the invention and suitable for use in the block-based coding system of FIG. 1.

FIG. 3 depicts an implementation of a full-pel motion estimation module 128 according to an embodiment of the invention and suitable for use in the block-based coding system of FIG. 1. Specifically, motion estimation module 128 of FIG. 3 comprises a first component weighter 128-7, a second component weighter 128-8, and a motion estimator 128-9.

The first component weighter 128-7 receives the luminance Y and color difference U, V components of a macroblock within the input macroblock stream 102. In response, the first component weighter 128-7 applies a weighting, or scaling factor, to each component Y, U and V, to produce an image-representative output signal $YUV_1$. The output signal $YUV_1$ is not a true luminance or chrominance signal; rather, the output signal $YUV_1$ is an image representative signal comprising image information components generated using the luminance and chrominance components of the input macroblock.

The second component weighter 128-8 receives the luminance Y' and color difference U', V' components of the original anchor frame. In response, the second component weighter 128-8 applies a weighting, or scaling factor, to each component Y', U' and V', to produce an image-representative output signal $YUV_2$. The $YUV_2$ output signal comprises an image representative signal such as the $YUV_1$ output signal of first component weighter 128-8. Moreover, the weighting coefficients utilized by the second component weighter 128-8 are the same as those utilized by the first component weighter 128-7.

The image representative output signals $YUV_1$ and $YUV_2$ of, respectively, first and second component weighters 128-7 and 128-8, are coupled to respective inputs of the motion estimator 128-9. Motion estimator 128-9 performs a full-pel motion estimation function in a substantially standard manner to produce full pel motion vectors (MVs) for use by, e.g., half-pel motion estimator 127. In addition, the output signal of the full-pel motion estimator 128 includes selection indicium (SELECTION DATA) that indicates type of motion estimation selected as the "best" type. The selection indicium maybe utilized by, e.g., half-pel motion estimator 127 to further refine the motion estimate, and motion mode block 132 to assist in the motion mode decision process.

In another embodiment of the invention, the component weighters 128-7 and 128-8 produce respective "principle components" type signals for use in the motion estimator 128-9. Principle components signals are typically used to produce a single composite output image from multi-spectral imaging sources. While there are various methods that may be used to form principle components signals, a straightforward method comprises the steps of selecting each pixel of an output image from the pixel of the input image that has the highest value (or the value closest to an optimal value). In the case of U and V color difference signals which are bipolar (+ and −), an absolute value transformation is applied prior to the pixel selection. A macroblock-related principle component signal $YUV_1$ and an anchor frame-related principle component signal $YUV_2$ are processed by the motion estimator 128-9 in substantially the same manner as described above to produce full pel motion vectors (MVs) for use by, e.g., half-pel motion estimator 127.

Advantageously, the above-described "principle components" approach requires no more motion estimation hardware than a simple luminance-only motion estimation circuit. Moreover, the hardware required to form the principle components signals (i.e., component weighters 128-7 and 128-8) is minimal relative to the motion estimation circuit complexity of FIG. 2. That is, the circuit complexity required to implement component weighters 128-7 and 128-8 of FIG. 3 is less that the circuit complexity required to implement first and second color difference motion estimators 128-2 and 128-3 shown in FIG. 2.

In still another embodiment of the invention, component weighters 128-7 and 128-8, and motion estimator 128-9 operate on red R, blue B and green G primary color signals. However, the embodiment requires a more complex motion estimator than required in the above-described motion estimation embodiments.

The above-described embodiments of the invention advantageously provide high quality compression encoding, even in the case of low luminance energy. By performing motion estimation in both chrominance space and luminance space, and selecting the best motion estimate, the invention provides an optimization of the compression encoding process. In addition, the above-described embodiments may be easily adapted to different video formats, such as the well known 4:2:2 and 4:4:4 video formats.

Although various embodiments which incorporate the teachings of the present invention have been shown and described in detail herein, those skilled in the art can readily devise many other varied embodiments that still incorporate these teachings.

What is claimed is:

1. A method for optimizing motion estimation within a block-based coding system, said method comprising the steps of:

estimating, using only a luminance component, the motion of a macroblock to be coded with respect to an anchor frame, to produce a first motion vector and first residual;

estimating, using only a first chrominance component, the motion of said macroblock to be coded with respect to said anchor frame, to produce a second motion vector and second residual; and selecting, as a preferred motion vector to use in a subsequent motion estimation or motion encoding process, one of said first motion vector and said second motion vector;

said preferred motion vector being utilized, in a predictive encoding mode, to encode said macroblock to be coded.

2. The method of claim 1, wherein said step of selecting comprises the steps of:

comparing said first residual to a threshold level; and in the case of said first residual being less than said threshold level:

selecting said first motion vector as said preferred motion vector;

in the case of said first motion vector being equal to or greater than said threshold level:

comparing said first residual to said second residual; and selecting, as said preferred motion vector, the motion vector associated with the smallest residual.

3. The method of claim 1, wherein said step of selecting comprises the steps of:

comparing said first residual to said second residual; and selecting, as said preferred motion vector, the motion vector associated with the smallest residual.

4. The method of claim 1, further comprising the step of:

estimating, using a second chrominance component, the motion of a macroblock to be coded with respect to an anchor frame, to produce a third motion vector and third residual;

said selected preferred motion vector comprising one of said first motion vector, said second motion vector and said third motion vector.

5. The method of claim 4, wherein said step of selecting comprises the steps of:

comparing said first residual to a threshold level; and in the case of said first residual being less than said threshold level:

selecting said first motion vector as said preferred motion vector;

in the case of said first motion vector being equal to or greater than said threshold level:

comparing said first, second and third residuals; and selecting, as said preferred motion vector, the motion vector associated with the smallest residual.

6. Apparatus for estimating motion in a block-based coding system, comprising:

a first motion estimator, coupled to receive only luminance information associated with a macroblock to be coded and an anchor frame, for generating a first motion vector and associated first residual;

a second motion estimator, coupled to receive only first chrominance information associated with said macroblock to be coded and said anchor frame, for generating a second motion vector and associated second residual;

a selector, coupled to said first and second motion estimators, for selecting and coupling to an output as preferred motion vector, one of said first motion vector and said second motion vector.

7. The apparatus of claim 6, further comprising:

a scaler, for scaling said second motion vector and associated second residual to a level representative of a sampling density of said first motion vector and associated first residual.

8. The apparatus of claim 6, further comprising:

a third motion estimator, coupled to receive second chrominance information associated with said macroblock to be coded and said anchor frame, for generating a third motion vector and associated third residual;

said selector further being coupled to said third motion estimator;

said preferred motion vector comprising a preferred one of said first, second and third motion vectors.

9. The apparatus of claim 8, wherein said preferred one motion vector is the motion vector associated with the lowest value residual among said first, second and third residuals.

10. The apparatus of claim 8, wherein:

said preferred one motion vector is the first motion vector if said first residual is below a threshold value; and said preferred one motion vector is the motion vector associated with the lowest value residual among said first, second and third residuals if said first residual is not below said threshold value.

* * * * *